United States Patent [19]
Parrish et al.

[11] Patent Number: 5,416,694
[45] Date of Patent: May 16, 1995

[54] COMPUTER-BASED DATA INTEGRATION AND MANAGEMENT PROCESS FOR WORKFORCE PLANNING AND OCCUPATIONAL READJUSTMENT

[75] Inventors: Eve J. Parrish, Laguna Niguel; Rodney P. Freudenberg, La Crescenta; Albert Scsigulinsky, Claremont; Richard Cho, Montebello, all of Calif.

[73] Assignee: Hughes Training, Inc., Arlington, Tex.

[21] Appl. No.: 203,465

[22] Filed: Feb. 28, 1994

[51] Int. Cl.⁶ ............................................. G06F 15/21
[52] U.S. Cl. ..................................................... 364/401
[58] Field of Search ........................... 364/401, 419.19

[56] References Cited

U.S. PATENT DOCUMENTS 5,117,353  5/1992  Stipanovich et al. ................ 364/401
5,164,897  11/1992  Clark et al. .......................... 364/401
5,197,004  3/1993  Sobotka et al. ................. 364/419.19

OTHER PUBLICATIONS

Data Sources, 1st Edition, vol. 2, 1990, pp. J256-J257.

Primary Examiner—Donald E. McElheny, Jr.
Attorney, Agent, or Firm—W. K. Denson-Low

[57] ABSTRACT

Disclosed is a computer system and a method for a computer-based data integration and management processing system and a method for workforce planning and occupational readjustment. The system and method of the present invention uses a number of databases that are either created internally or are imported from existing databases. These databases are manipulated by the invention for skill matching analysis based on a rigorous behavioral skill analysis of target occupations, using one or more predetermined analysis metrics and an examination of an individual's skills using metrics with similar behavioral attributes.

13 Claims, 1 Drawing Sheet

COMPUTER-BASED DATA INTEGRATION AND MANAGEMENT PROCESS FOR WORKFORCE PLANNING AND OCCUPATIONAL READJUSTMENT

BACKGROUND OF THE INVENTION

1. Field of the Invention

This invention relates in general to computer-based database systems, and, more particularly, to a computer-based data integration and management processing system and a method for workforce planning and occupational readjustment.

2. Description of the Related Art

Existing systems and methods for workforce planning and occupational readjustment, have traditionally concentrated mainly on the manual analysis of an individual's skills, with less or no emphasis on a related job analysis or needs analysis of potential employers.

Additionally, links to training resources and new training requirements are typically not addressed as part of an overall approach.

The individual is matched without any analysis of the demands of the particular position, but only with whether or not the individual possesses or can be trained to possess the skills for a particular position, regardless of whether there is a true demand for the position.

The present invention meets and overcomes this mismatching problem by providing a computer-based data integration and management process to assist in workforce planning and occupational readjustment by matching required new or emerging job skills with an individual's known skills, identifying skill deficiencies, and planning training interventions. The present invention can also be used in the areas of career development and succession planning.

The system and method of the present invention uses a number of databases that are either created internally or are imported from existing databases. These databases are manipulated by the invention for skill matching analysis based on a rigorous behavioral skill analysis of target occupations, using one or more predetermined analysis metrics and an examination of an individual's skills using metrics with similar behavioral attributes.

OBJECTS AND SUMMARY OF THE INVENTION

Therefore, it is an object of the present invention to provide a computer database system and a method having an open architecture allowing a variety of uses depending on the types of data and databases developed for the matching activity.

It is still another object of the present invention to provide a method and system that has a great deal of flexibility in providing the career counselor "just in time" information in support of the overall career planning process.

It is an object of the present invention to provide a method and system that will assist a manager in providing a rational plan for the development of career goals and the generation of rational choices in determining occupational transition paths by identifying a match between a participant's skills and interests and with those of a particular demand occupation in a consistent uniform approach in determining match and requisite training needs.

It is another object of the present invention to provide a method and system that will assist a manager in providing a rational plan for the development of career goals and the generation of rational choices in determining occupational transition paths that is automated so that a manager will be able to handle an increased participant load with no degradation in effectiveness, thereby demonstrating productivity improvement over existing traditional methods.

Other advantages of the method and system of the present invention include:

(a) assessment of the match between demand occupational requirements and an individual's core skills, competencies and interests;

(b) analysis and update of the demand occupation database through systematic job analytic techniques;

c) specification of core curricula to support training needs; linkage of new training requirements with identified training resources.

It is another object of the present invention to provide a method and system that facilitates, rather than prevents, the rational analysis of an individual's skills with a job and needs analysis of potential employers.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

Figure 1:
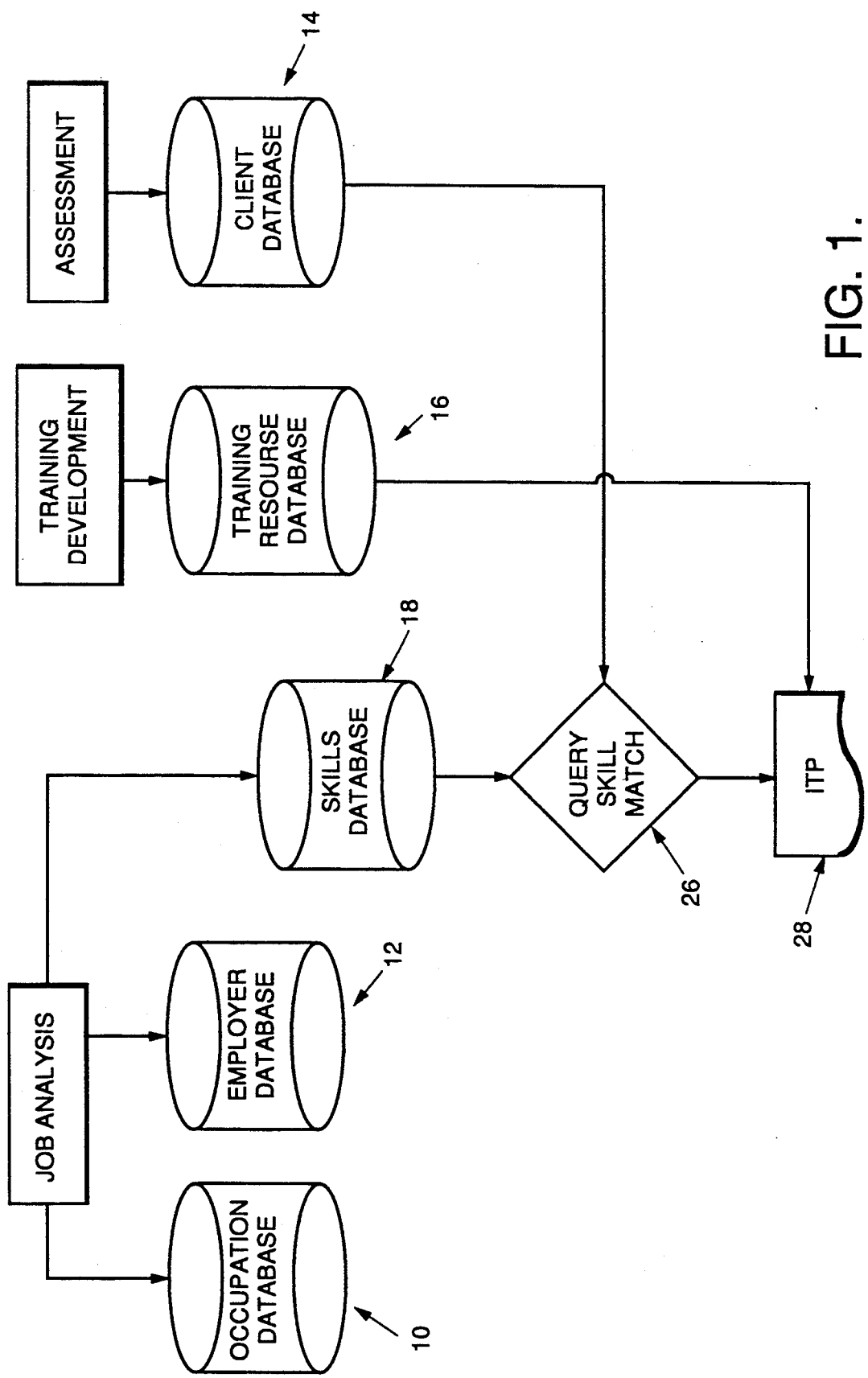
FIG. 1 is a block diagram flowchart showing the general overall logic flow and interrelationship of the various databases in a system incorporating the present invention.

A preferred form of the invention as embodied in a method and computing system for a computer-based data integration and management processing system and a method for workforce planning and occupational readjustment providing hardware and software components that support an integrated process in providing job placement is now described.

Placement analysis in the present invention is based upon optimal matching of skills and interests of prospective candidates with skills and interests required for demanded occupations. In order to maximize the matching process, the present invention provides a detailed training plan aimed at bridging any skills shortfall. The training plan of the present invention directs an individual to appropriate training resources to remediate identified gaps. Although a primary objective of the present invention is job placement, the system and method of the invention is general enough to also support public and private industry in-house training needs, as well as career guidance and counseling in the academic environment.

A high level view of the system and method of the present invention is now presented. The level of detail is at a user's perspective, and explains the system architecture, all major components and interfaces, and processing resources. Operational concepts and scenarios relate the role of the system and method of the present invention in the overall process.

A preferred system architecture embodying the present invention includes a general computer platform capable of running in a standalone configuration, or in a multi-user environment over a network. An example of such a preferred computing platform is a microcontroller running under a 80486 or compatible computing engine such as a 80486 DX2, 33 MHz personal computer with associated peripherals and devices. The preferred computing platform would have 16 MB RAM, a math co-processor, a 1.2 GB hard disk drive with a Small Computer System Interface (SCSI) controller, along with standard input/output peripheral devices such as 5.25" and 3.5" floppy drive units. The monitor is preferably a 17" monochrome unit having a 1024×768 VGA resolution with a 0.28 mm dot pitch, although other monitors, such as a color monitor, are also included in the scope of the present invention.

Additional preferred peripheral devices would include a FAX/MODEM unit, and provisions for connection onto a commercial available Local Area Network (LAN). A 2.0 GB high-capacity, medium transfer-rate Digital Audio Tape (DAT) unit is preferred for general maintenance and backup activities.

A preferred software architecture embodying the present invention includes one Computer Software Configuration Item (CSCI) having three components.

The first component provides the operating system environment. This operating system environment can be any of the commercial available single or multi-tasking environments current available. All system services including the LAN interface are handled by this component.

The second component provides for a Relational DataBase Management System (RDBMS) and its application. This component handles the population of all databases, conducting queries and matches, and producing Individual Training Plans (ITP).

The third component provides for unique application software which must be generated outside of the database application, including software utilities to support, maintain and test the system application of the present invention. The application provides customized data input capabilities to populate skills, occupations, training resources, participants, and employers databases. The application's primary output is a report detailing a training plan aimed at maximizing the match. The training plan will point out skill deficiencies and suggest appropriate training resources for remediation. The application also features a variety of other customized reports to aid the user in identifying training objectives and generating plans to achieve these objectives.

Likewise, there are three external interfaces in the preferred system embodying the present invention.

The first external interface deals with populating the several databases and includes such data as skills matching data needed to drive the analysis and selection process. This includes data intake from the system's user or participant's input directly by a user based upon an interview and discussion with a participant. This interface is through special data entry screens enabling direct population of participant databases. Both manual input and automatic input using software utilities are envisioned within the system of the present invention.

The following application databases are populated in a preferred embodiment of the present invention as shown in FIG. 1:

a. Demand Occupations database 10;
b. Demand Occupations Employer database 12;
c. Client Skills database 14;
d. Training Resources database 16;
e. Skills database 18;

The second external interface involves an output device 28 operating in association with report generator 26 operating under report generation software. Output is formatted and transmitted via hardcopy on a printer, electronically on magnetic storage media, or simply on the computer monitor. This interface provides for various reports generation, in addition to the participant's ITP. User interface for reports generation shall be accomplished through inputs on the keyboard included with the hardware computing platform of the system. Reports shall be output to the monitor or to the printer included with the hardware component of the system.

Customized reports are preferably available in two manners, the first being by user invocation of established output scripts, the other by user invocation of querying capabilities for the database application.

Finally, a third external interface provides for linking the system of the present invention to a LAN, and operating in a network configuration to share operational databases, as well as to input and output data with systems external to the system of the present invention.

In actual operation, there are two operational scenarios. The first involves setting up and populating the databases. This will be an ongoing process throughout the life cycle of the system. Database population will be accomplished by several users: the database developer; the job analyst; the job developer; and the client manager. The second scenario will focus on the client manager working with the participant to gather personal information and generate ITPs. This latter scenario will be done by client managers.

The first scenario proceeds as follows:
1. Power on the system;
2. Conduct initial logon and set up;
3. Choose database to populate;
4. Populate databases;
5. Conclude database population session;
6. Logoff/power off.

The second scenario proceeds as follows:
1. Power on the system;
2. Conduct initial logon and set up;
3. Interview and input participant data;
4. Run queries to obtain matching;
5. Conduct other queries/reports as desired;
6. print ITP/discuss with participant;
7. Logoff/power off.

In general, as shown in FIG. 1, the invention is found in a computer system and method operating either standalone or over a network in accord with the following steps outlined below in detail to provide for a number of databases, created either internally or imported from existing databases, that are manipulated by the invention for skill matching analysis based on a rigorous behavioral skill analysis of target occupations, using one or more predetermined analysis metrics and an examination of an individual's skills using metrics with similar behavioral attributes.

A preferred system architecture embodying the present invention for workforce planning and occupational readjustment utilizing a computer-based data integration and management processing system includes a computer platform having a memory device and input/output and display peripherals. A basic computing platform as described above is preferred for the hardware aspect of the architecture.

The computer memory device must have sufficient storage capability to store therein a demand occupations database, a demand occupations employer database, a skills database, a training resources database, and, a participant data profile database. Preferably these databases will store their individual data elements in a relational database structure capable of being operated on by a relational database management system.

The input/output peripherals are chosen to be capable of populating each of the established databases with preselected data entered by a user as with a keyboard, or automatically from separate systems or media such as tape or magnetic disks.

The computer contains a set of preselected operating instructions for its control that are stored in the computer memory device for performing the following actions:

Establishing a demand occupations database on the memory device having at least one data record representing an occupation in demand by a preselected group of employers. Normally this database is preferably populated by an extensive survey of employers, extracting their open employment positions and the various skills and skill levels identified with each open employment position.

Establishing a skills database on the memory device having, for each demand occupation in the demand occupation database, at least one data record associated therewith. The data fields of the data record define a profile of the skills required for the associated demand occupation as indicated by the surveys conducted with the employers contacted in populating the demand occupations database. In reality, this database contains a definition of the demand occupations appearing in the previously established demand occupations database including the various skills and skill levels needed to qualify for the demand occupation appearing in the demand occupations database.

Establishing a training resources database on the memory device having at least one data record representing a source of available training for each skill in the skills database. Each data record in the training resources database is preferably comprised of data fields representing a training resource profile of preselected information for each training source. Examples of data held in this database would include training courses offered by local educational facilities, the cost and availability of such courses as well as entrance requirements for such courses.

Building at the computer host system, a client desired position profile having a plurality of preselected parameters with a client assigned preferential weight associated with each parameter. The client creates and tailors this position profile to indicate not only his existing employment position, but to indicate what may be a desired, but never done employment category by using his ability to preferentially weight each parameter.

Building at the computer host system, a client skills profile having a plurality of parameters representing known skills of the client. The invention does require an objective input as to what skills the client actually possesses as a baseline to begin its analysis.

Generating on the computer host system a demand occupations match profile having its data records each representing the results of a comparison between the client desired position profile and the data records in the demand occupations database to order the data records in the demand occupations match profile in accord with a preselected ordering hierarchy based on the client assigned preferential weighted parameters. This comparison enables the system to parse the databases to determine the closest match, using the client's defined preferentially weighted parameters indicating the client's desires.

Generating on the computer host system a demand occupations description profile for each demand occupation in the demand occupations match profile, representing an association of the particular skills database record associated with each demand occupation in the job match profile. This profile assists the user, and his counselor, to have a current definition of each of the skills and skill levels required for each of the selected demand occupations. The user, and his counselor, are not only current with this definition, but can immediately gain familiarity with demand occupations that they have never encountered previously.

Generating on the computer host system a client skills analysis whose data records represent a comparison of the data records in the client skills profile with each of the skills data records for client selected ones of demand occupations appearing in the demand occupations description profile. The client skills analysis data records represent both matches in client skills and deficiencies. With this report, the client and his counselor, the client manager, can begin the task of determining the "human" fit of the client, with his desires and skills, with the objectively required skills.

Generating on the computer host system an available training resources profile whose data records represent, for each data record in the client skills analysis representing a client skills deficiency, a match of the data records representing deficiencies with a training source providing training for the deficient skill. This report enables the client and his counselor to determine what resources are available to obtain missing skills, as well as the cost and entrance requirements for such training.

Displaying the available training resources profile on a preselected display peripheral of the computer host system.

Displaying the available demand occupations description profile on a preselected display peripheral of the computer host system.

Likewise, each of these output activities can also be accomplished by sending the various data to output peripherals of the computer host system such as printers.

Displaying the demand occupations match profile on a preselected display peripheral of the computer host system.

Establishing an employer database on the computer host system having, for each demand occupation in the demand occupations database, at least one data record representing an employer seeking an individual having the skills associated with the demand occupation.

This employer database will also include data of employers who are likely to have such demanded occupations within their company, though they may not currently have a need to fill these positions. This database presents a list of "typical" employers for a given demanded occupation; it is not necessarily meant to represent an employer with a known opening.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A method for workforce planning and occupational readjustment utilizing a computer-based data integration and management processing system having a computer host system, a memory device, input/output and display peripherals, comprising the steps of:

establishing a demands occupations database on the memory device having at least one data record representing an occupation in demand by a preselected group of employers;

establishing a skills database on the memory device having, for each demand occupation in said demands occupation database, at least one data record associated therewith, the data fields of said data record defining a profile of the skills required for the associated demand occupation;

establishing a training resources database on the memory device having at least one data record representing a source of available training for each skill in said skills database each data record in said training resources database comprised of data fields representing a training resource profile of preselected information for each training source;

building at the computer host system, a client desired position profile having a plurality of preselected parameters with a client assigned preferential weight associated with each parameter;

building at the computer host system, a client skills profile having a plurality of parameters representing known skills of the user;

generating on the computer host system a demand occupations match profile having its data records each representing the results of a comparison between said client desired position profile and said data records in said demand occupations database to order the data records in said demand occupations match profile in accord with a preselected ordering hierarchy based on the client assigned preferential weighted parameters;

generating on the computer host system a demand occupations description profile for each demand occupation in said demand occupations match profile, representing an association of the particular skills database record associated with each demand occupation in said job match profile;

generating on the computer host system a client skills analysis whose data records represent a comparison of the data records in said client skills profile with each of said skills data records in said demand occupations description profile, said client skills analysis data records representing both matches in client skills and deficiencies;

generating on the computer host system an available training resources profile whose data records represent, for each data record in said client skills analysis representing a client skills deficiency, a match of said data records representing deficiencies with a training source providing training for the deficient skill.

2. The method of claim 1 further including the step of:

displaying said available training resources profile on a preselected display peripheral of the computer host system.

3. The method of claim 1 further including the step of:

displaying said available demand occupations description profile on a preselected display peripheral of the computer host system.

4. The method of claim 1 further including the step of:

displaying said demand occupations match profile on a preselected display peripheral of the computer host system.

5. The method of claim 1 further including the step of:

sending said available training resources profile to a preselected output peripheral of the computer host system.

6. The method of claim 1 further including the step of:

sending said available demand occupations description profile to a preselected output peripheral of the computer host system.

7. The method of claim 1 further including the step of:

sending said demand occupations match profile to a preselected output peripheral of the computer host system.

8. The method of claim 1 further including the step of:

establishing an employer database on the computer host system having, for each demand occupation in said demands occupation database, at least one data record representing an employer likely to hire for the demand occupation.

9. The method of claim 1 wherein the step of generating on the computer host system a client skills analysis whose data records represent a comparison of the data records in said client skills profile with each of said skills data records in said demand occupations description profile, said client skills analysis data records representing both matches in client skills and deficiencies, further includes the step of:

selecting for said comparison client selected ones of said demand occupations appearing in said demand occupations description profile.

10. A method for workforce planning and occupational readjustment utilizing a computer-based data integration and management processing system having a computer host system, a memory device, input/output and display peripherals, comprising the steps of:

establishing a demands occupations database on the memory device having at least one data record representing an occupation in demand by a preselected group of employers;

establishing a skills database on the memory device having, for each demand occupation in said demands occupation database, at least one data record associated therewith, the data fields of said data record defining a profile of the skills required for the associated demand occupation;

establishing a training resources database on the memory device having at least one data record representing a source of available training for each skill in said skills database each data record in said training resources database comprised of data fields representing a training resource profile of preselected information for each training source;

building at the computer host system, a client desired position profile having a plurality of preselected parameters with a client assigned preferential weight associated with each parameter;

building at the computer host system, a client skills profile having a plurality of parameters representing known skills of the user;

generating on the computer host system a demand occupations match profile having its data records each representing the results of a comparison between said client desired position profile and said data records in said demand occupations database to order the data records in said demand occupations match profile in accord with a preselected ordering hierarchy based on the client assigned preferential weighted parameters;

generating on the computer host system a demand occupations description profile for each demand occupation in said demand occupations match profile, representing an association of the particular skills database record associated with each demand occupation in said job match profile;

generating on the computer host system a client skills analysis whose data records represent a comparison of the data records in said client skills profile with each of said skills data records for client selected ones of demand occupations appearing in said demand occupations description profile, said client skills analysis data records representing both matches in client skills and deficiencies;

generating on the computer host system an available training resources profile whose data records represent, for each data record in said client skills analysis representing a client skills deficiency, a match of said data records representing deficiencies with a training source providing training for the deficient skill;

displaying said available training resources profile on a preselected display peripheral of the computer host system;

displaying said available demand occupations description profile on a preselected display peripheral of the computer host system;

displaying said demand occupations match profile on a preselected display peripheral of the computer host system.;

establishing an employer database on the computer host system having, for each demand occupation in said demands occupation database, at least one data record representing an employer likely to hire for the demand occupation.

11. The method of claim 10 further including the step of:

sending said available training resources profile to a preselected output peripheral of the computer host system.

12. The method of claim 10 further including the step of:

sending said available demand occupations description profile to a preselected output peripheral of the computer host system.

13. The method of claim 10 further including the step of:

sending said demand occupations match profile to a preselected output peripheral of the computer host system.

* * * * *